United States Patent
Earl

(10) Patent No.: US 9,582,198 B2
(45) Date of Patent: Feb. 28, 2017

(54) COMPRESSED BLOCK MAP OF DENSELY-POPULATED DATA STRUCTURES

(71) Applicant: VMware, Inc., Palo Alto, CA (US)

(72) Inventor: William Earl, Seattle, WA (US)

(73) Assignee: VMware, Inc., Palo Alto, CA (US)

(*) Notice: Subject to any disclaimer, the term of this patent is extended or adjusted under 35 U.S.C. 154(b) by 63 days.

(21) Appl. No.: 14/032,121

(22) Filed: Sep. 19, 2013

(65) Prior Publication Data

US 2015/0058577 A1 Feb. 26, 2015

Related U.S. Application Data

(60) Provisional application No. 61/870,139, filed on Aug. 26, 2013.

(51) Int. Cl.
*G06F 12/12* (2016.01)
*G06F 3/06* (2006.01)

(52) U.S. Cl.
CPC ............ *G06F 3/0613* (2013.01); *G06F 3/064* (2013.01); *G06F 3/067* (2013.01); *G06F 3/0667* (2013.01); *G06F 3/0688* (2013.01)

(58) Field of Classification Search
None
See application file for complete search history.

(56) References Cited

U.S. PATENT DOCUMENTS

| | | |
|---|---|---|
| 6,314,526 B1 | 11/2001 | Arendt et al. |
| 6,553,389 B1 | 4/2003 | Golding et al. |
| 6,658,473 B1 | 12/2003 | Block et al. |
| 6,839,752 B1 | 1/2005 | Miller et al. |
| 7,360,030 B1 | 4/2008 | Georgiev |
| 7,669,029 B1 | 2/2010 | Mishra et al. |
| 7,716,425 B1 | 5/2010 | Uysal et al. |
| 8,074,003 B1 | 12/2011 | Salamon et al. |
| 8,103,769 B1 | 1/2012 | Weiser et al. |

FOREIGN PATENT DOCUMENTS

| | | |
|---|---|---|
| WO | 2008109321 A1 | 9/2008 |
| WO | 2010048048 A2 | 4/2010 |

OTHER PUBLICATIONS

Jacek Migdal. 2011. Data Block Encoding of KeyValues (aka delta encoding / prefix compression). The Apache Software Foundation HBase. https://issues.apache.org/jira/browse/HBASE-4218.*
Jonathan Gray. 2009. Concurrent LRU Block Cache. The Apache Software Foundation HBase. https://issues.apache.org/jira/browse/HBASE-1460.*
(Continued)

(Continued)

*Primary Examiner* — Reginald Bragdon
*Assistant Examiner* — Edward Wang
(74) *Attorney, Agent, or Firm* — Patterson & Sheridan LLP

(57) ABSTRACT

Embodiments of the disclosure provide techniques for creating a compressed mapping structure in a system of resources. For example, a distributed resources system may use delta encoding to store, in memory, numerous entries of dense data structures in the system. In a compressed block of such entries, the distributed resources system encodes the key of each entry as the delta from the key of the previous entry. The content of each entry is encoded similarly. The distributed resources system suppresses the leading zero bits of each resulting field.

17 Claims, 9 Drawing Sheets

(56) References Cited

U.S. PATENT DOCUMENTS

| | | | |
|---|---|---|---|
| 8,127,059 B1 | 2/2012 | Carr et al. | |
| 8,453,036 B1 | 5/2013 | Goel et al. | |
| 8,635,422 B1 | 1/2014 | Kaliannan et al. | |
| 8,682,916 B2 | 3/2014 | Wong et al. | |
| 8,843,925 B1 | 9/2014 | Beda, III et al. | |
| 8,954,979 B1 | 2/2015 | Myers et al. | |
| 8,984,243 B1 | 3/2015 | Chen et al. | |
| 9,015,123 B1 | 4/2015 | Mathew et al. | |
| 9,020,912 B1* | 4/2015 | Majee et al. | 707/693 |
| 2003/0131020 A1 | 7/2003 | Karamanolis et al. | |
| 2003/0158836 A1 | 8/2003 | Venkatesh et al. | |
| 2003/0204509 A1 | 10/2003 | Dinker et al. | |
| 2004/0177228 A1 | 9/2004 | Leonhardt et al. | |
| 2004/0215639 A1 | 10/2004 | Bamford et al. | |
| 2005/0097073 A1 | 5/2005 | Mair et al. | |
| 2005/0166011 A1 | 7/2005 | Burnett et al. | |
| 2005/0240714 A1 | 10/2005 | McCauley et al. | |
| 2006/0218360 A1 | 9/2006 | Burkey | |
| 2007/0055703 A1 | 3/2007 | Zimran et al. | |
| 2009/0172666 A1 | 7/2009 | Yahalom et al. | |
| 2009/0271412 A1 | 10/2009 | Lacapra et al. | |
| 2009/0276566 A1 | 11/2009 | Coatney et al. | |
| 2010/0299495 A1 | 11/2010 | Frank | |
| 2011/0087631 A1 | 4/2011 | Feldman et al. | |
| 2011/0238814 A1 | 9/2011 | Pitts | |
| 2011/0238857 A1 | 9/2011 | Certain et al. | |
| 2012/0137066 A1 | 5/2012 | Nolterieke et al. | |
| 2013/0204849 A1 | 8/2013 | Chacko | |
| 2013/0311989 A1 | 11/2013 | Ota et al. | |
| 2014/0115579 A1 | 4/2014 | Kong | |
| 2014/0130055 A1 | 5/2014 | Guha | |
| 2014/0156925 A1 | 6/2014 | Baron et al. | |
| 2014/0173226 A1* | 6/2014 | Gold | 711/159 |
| 2014/0201736 A1 | 7/2014 | Mizrahi et al. | |

OTHER PUBLICATIONS

Bishwaranjan Bhattacharjee, Lipyeow Lim, Timothy Malkemus, George Mihaila, Kenneth Ross, Sherman Lau, Cathy McArthur, Zoltan Toth, and Reza Sherkat. 2009. Efficient index compression in DB2 LUW. Proc. VLDB Endow. 2, 2 (Aug. 2009), 1462-1473. DOI=10.14778/1687553.1687573 http://dx.doi.org/10.14778/1687553.1687573.*

International Search Report and Written Opinion dated Oct. 17, 2014, International Application No. PCT/US2014/041761, 10 pages.

International Search Report and Written Opinion dated Sep. 5, 2014, International Application No. PCT/US2014/041757, 8 pages.

International Search Report and Written Opinion dated Sep. 1, 2014, International Application No. PCT/US2014/041764, 11 pages.

International Search Report and Written Opinion dated Oct. 1, 2014, International Application No. PCT/US2014/041164, 9 pages.

International Search Report and Written Opinion dated Dec. 8, 2014, International Application No. PCT/US2014/041172, 15pages.

Adam et al., "Regeneration with Virtual Copies for Replicated Databases,"[Proceedings of the International Conference on Distributed Computing Systems], Los Alamitos, IEEE Comp. Soc. Press, US. vol. Conf. 11, May 20, 1991, p. 429-436.

Hu et al., "Performance Evaluation of Dynamic Supporting Algorithms," Proceedings of the Annual International Computer Software and Applications Conference (COMPSAC), Los Alamitos, IEEE Comp., vol. Conf. 16, Sep. 21, 1992, pp. 90-95.

"Virtual Drive", Web Page <http://searchservervirtualization.techtarget.com/definition/virtual-drive>, Jun. 14, 2012, retrived from Internet Archive Wayback Machine <https://web.archive.org/web/20120614001609/http://searchservervirtualization.techtarget.com/definition/virtual-drive> on Feb. 3, 2016.

Direct Attached Storage. Article [online]. Apex Microsystems, 2009 [retrieved on May 4, 2016]. Retrieved from the Internet <http://www.apexmicrosystem.com/?page_id+518>.

* cited by examiner

| | OBJECT ID 805 | OFFSET 810 | LENGTH 815 |
|---|---|---|---|
| RECORD A 820 | 5 | 10 | 1 |
| RECORD B₁ 825 | 5 | 12 | 5 |
| RECORD B₂ 830 | 0 | 2 | 4 |

FIG. 8

COMPRESSED BLOCK MAP OF DENSELY-POPULATED DATA STRUCTURES

CROSS-REFERENCES TO RELATED APPLICATIONS

This application claims priority to U.S. Provisional Application Ser. No. 61/870,139 filed Aug. 26, 2013, which is incorporated by reference herein in its entirety. This application is also related to the following commonly assigned, co-pending non-provisional applications: "Distributed Policy-Based Provisioning and Enforcement for Quality of Service" (Ser. No. 14/010,247, ), "Load Balancing of Resources" (Ser. No. 14/010,275, ), "Scalable Distributed Storage Architecture" (Ser. No. 14/010,293, ), and "Virtual Disk Blueprints for a Virtualized Storage Area Network" (Ser. No. 14/010,316, ), each of which was filed on Aug. 26, 2013. Each related application is incorporated by reference herein in its entirety.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second or IOPS capabilities, etc.), usage of such shared local disks to store virtual disks or portions thereof may be distributed among the virtual machines based on the needs of each given virtual machine. This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure.

Some distributed storage systems are object-based. For example, storage objects use multiple resource characteristics of disks in the cluster, such as IOPS (input/output operations per second) and capacity of solid state disks and magnetic disks to provide storage to clients (e.g., virtual machines). Therefore, efficient use of the disks is an important concern. One issue related to efficient disk usage is minimizing write amplification in solid state disk drives. As is known, write amplification is an undesirable phenomenon associated with SSDs where the actual amount of physical information written is a multiple of the logical amount intended to be written. Because SSD blocks must be erased before being rewritten, the process to perform these operations results in moving data and metadata more than once. Doing so creates a large amount of write overhead in disks with a high rate of I/O operations, resulting in overall slower write operations. In addition, because SSDs have a finite amount of write operations, a high amount of write amplification decreases the lifespan of a SSD. Further, metadata stored in a distributed storage system may be numerous and therefore consume a considerable amount of space. The amount of space used for metadata may increase required I/O operations and slow the system.

SUMMARY

One or more embodiments disclosed herein provide a method for storing key-value entries in a host computer system of a distributed resources system. Given an entry having a current key having one or more fields and a current payload, each of the fields is encoded as a first delta from a corresponding field in a previous key. The method generally includes removing leading zero bits in each resulting field of the current key. The method also generally includes inserting the current key into a data store residing in memory of the host computer system.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

FIG. 8 illustrates an example use case for delta encoding a key-value record, according to one embodiment.

DETAILED DESCRIPTION

Figure 1:
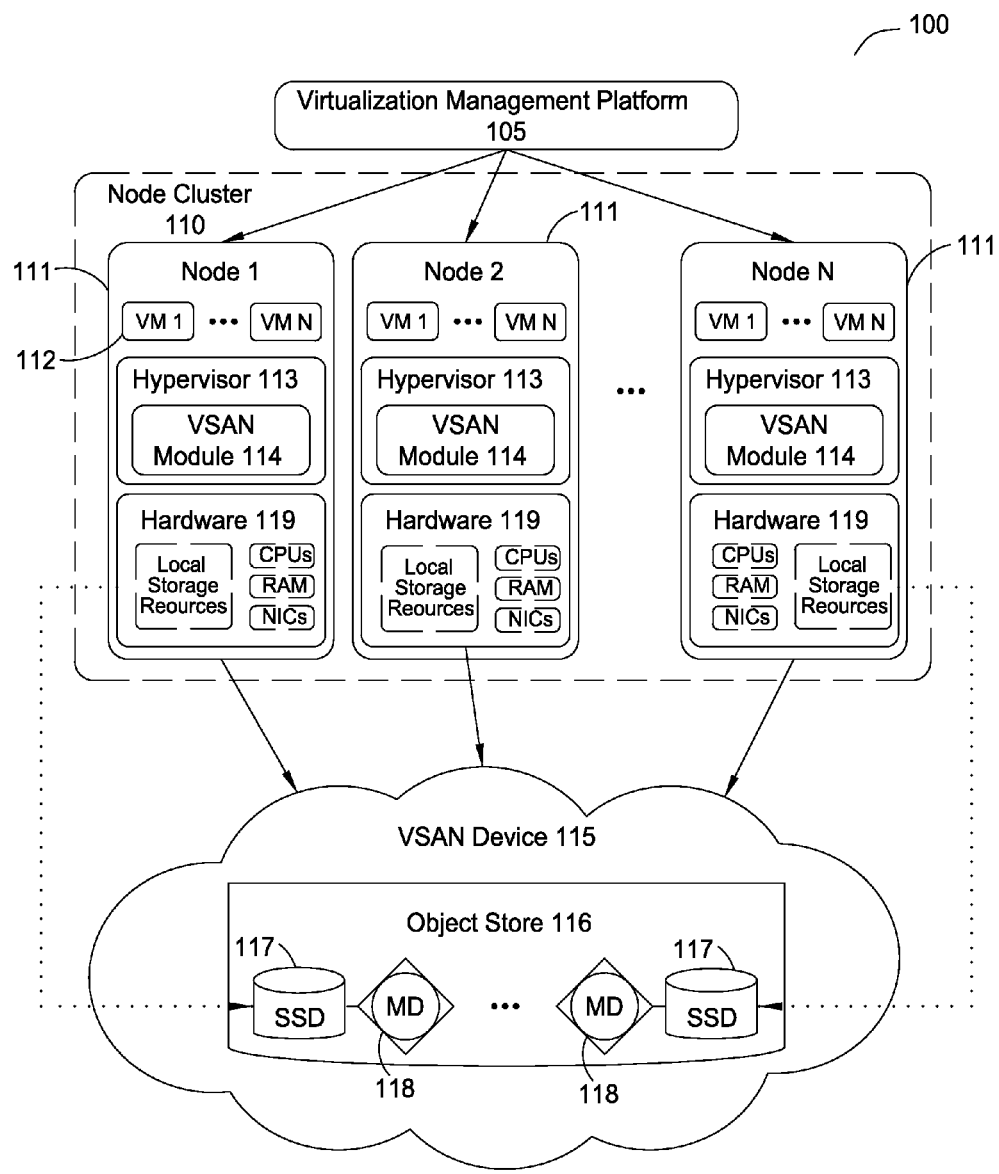
FIG. 1 illustrates an example computing environment, according to one embodiment.

Embodiments presented herein provide techniques for compressing entries in dense data structures used in a system of resources, such as a distributed resources system. More specifically, the techniques disclose an in-memory compression of mapping structures using delta encoding. For example, a distributed storage system may need to map data to block locations where the data is recorded. A map entry in the mapping structure may have a key that maps to a value. The key itself for a map entry may be a logical block offset of a block (or range of blocks), and the value may be a physical block offset along with a write buffer and the length of the extent in blocks. In one embodiment, in a compressed block of such entries, a distributed storage module encodes each key as a delta of the key in the previous entry (i.e., a bitwise subtraction of the two entries) with the leading zero bits removed from the key and value fields.

One example of an applicable distributed storage system that may use such mapping structures is a software-based "virtual storage area network" (VSAN) where host servers in a cluster each act as a node that contributes its commodity local storage resources (e.g., hard disk and/or solid state drives, etc.) to provide an aggregate "object" store. Each host server may include a storage management module (also referred to herein as a VSAN module) in order to automate storage management workflows (e.g., create objects in the object store, etc.) and provide access to objects in the object store (e.g., handle I/O operations to objects in the object store, etc.) based on predefined storage policies specified for objects in the object store. In one particular embodiment, the host servers further support the instantiation of virtual machines (VMs) which act as clients to the VSAN object store. In such an embodiment, the "objects" stored in the object store may include, for example, file system objects that may contain VM configuration files and virtual disk descriptor files, virtual disk objects that are accessed by the VMs during runtime and the like.

Further, in the example VSAN environment, storage object components comprise disk groups that each include a solid state drive (SSD) and one or more magnetic disks. Generally, the SSD serves as a front-end read buffer and write cache for the magnetic disks that store object data. Each SSD in the VSAN environment stores a journal of logical changes to persist prepared and committed changes. In one embodiment, the journal includes zero or more data pages per entry and a metadata entry that describes the change. Generally, metadata entries may be combined in metadata blocks for multiple in-flight concurrent requests. Rather than storing an index and allocation map of the metadata on a disk group SSD, the VSAN maintains, in the memory of each node, dense data structures for both the metadata index and the allocation map. Because the data structures are maintained in memory (and not on disk), the VSAN is able to minimize write amplification across disks in the virtualization cluster (for instance, by not performing as many on-disk write operations). However, the data structures used may include a large amount of entries. To account for memory limitations, the distributed storage system may implement the dense data structures using a compressed block map to reduce overall required capacity in storing the metadata in memory.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One of skill in the art will readily recognize from the following description that alternative embodiments of the structures and methods illustrated herein may be employed without departing from the principles described herein.

In the following, an example of a software-defined storage area network in a virtualized computing environment is used as a reference example of delta encoding key-value entries stored in dense data structures of a distributed resources system. This reference example is included to provide an understanding of the embodiments described herein. However, it will be apparent to one of skill in the art that these embodiments are applicable in other contexts relating to compressing entries in any dense data structures in distributed resources systems outside of the virtualization or storage environment. Furthermore, the embodiments are also applicable in contexts related to a local storage system.

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring novel aspects of the disclosure.

FIG. 1 illustrates a computing environment 100, according to one embodiment. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/ root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPS, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains met adata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
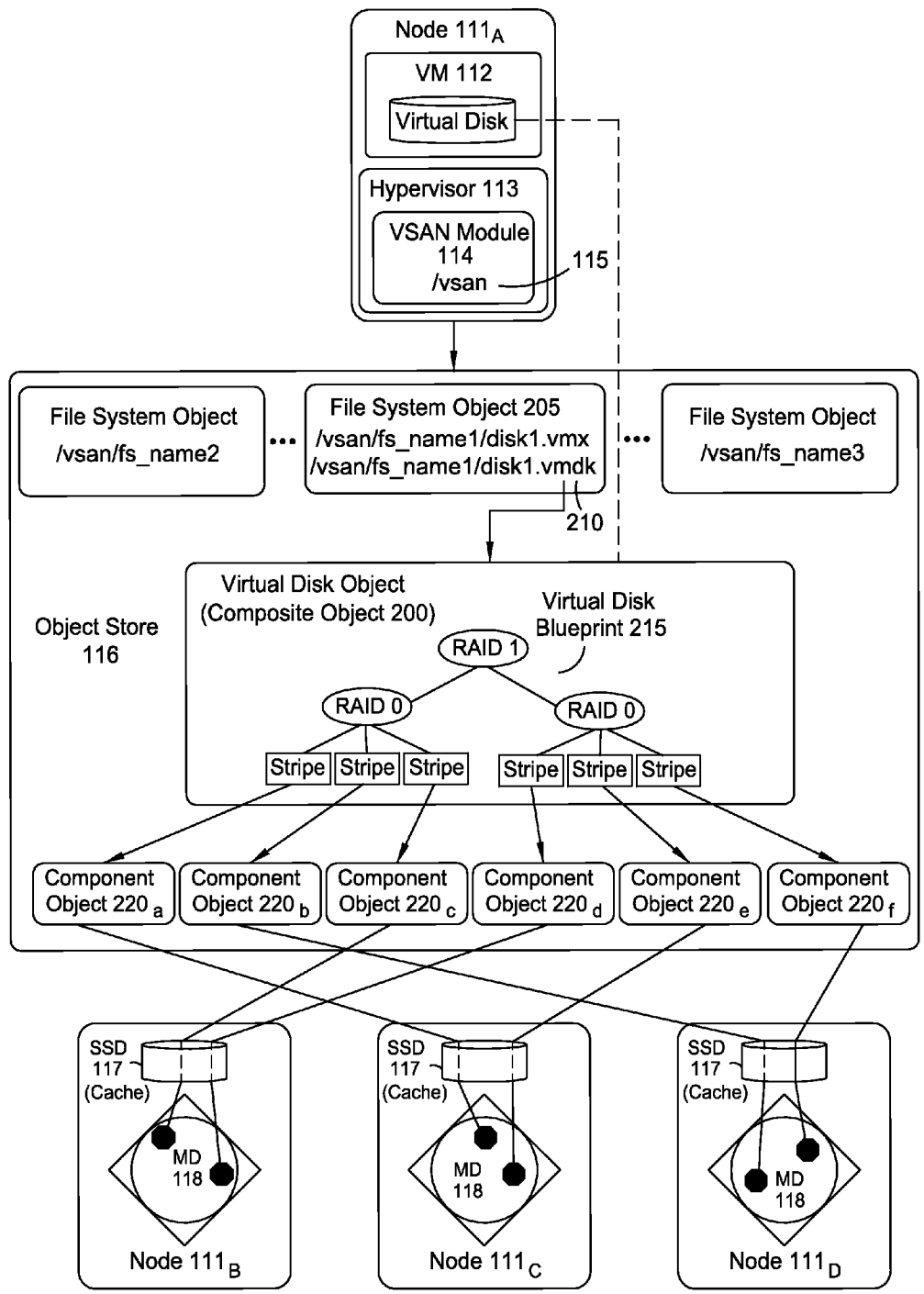
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPS, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Each SSD 117 stores a journal for the disks in the corresponding disk group (i.e., for the SSD 117 itself and underlying magnetic disks 118). Each journal maintains entries of logical changes to component objects $220_X$ to persist prepared and committed changes in the latency path. Further, each journal may include data pages per entry and a metadata entry that describes the changes and references the data pages. To minimize the amount of metadata write operations, SSD 117 performs the metadata operations in one stream. For example, generally, given three write operations to each of five disks in the disk group (e.g., for redundancy), typically the data blocks are stored on a SSD 117, once the data blocks are on the disk, the metadata pointing to the blocks are recorded. In addition, VSAN module 114 may perform the write operations in a batch and record the metadata for each operation in a single SSD metadata block, reducing the amount of overall I/O operations. In addition, SSD 117 includes a read cache. The read cache may be managed as in-memory in a table that provides information of what resides in each cache line of the cache. The write buffer of SSD 117 includes several pages for data as well as metadata entries that reference the data pages.

Figure 3:
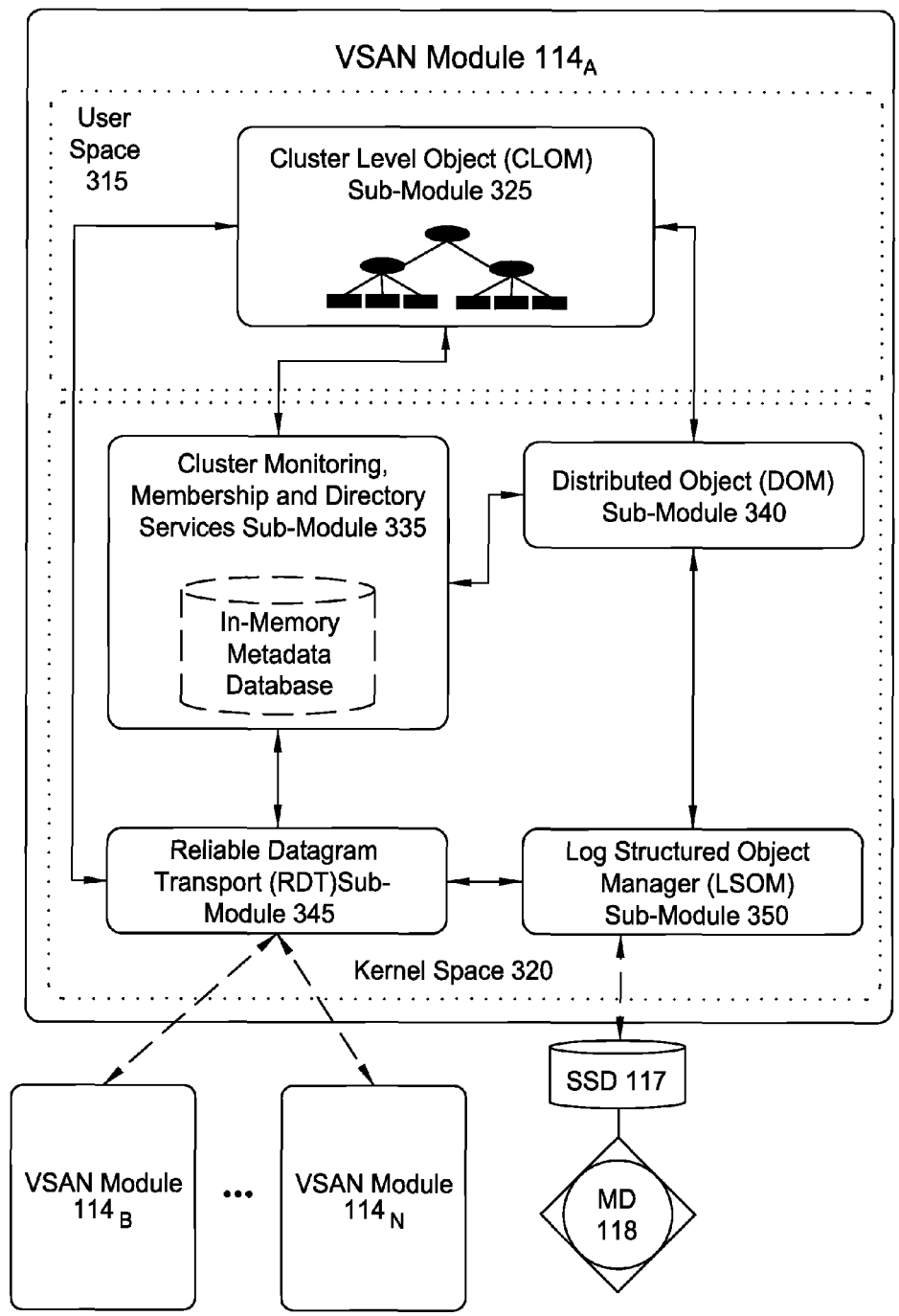
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
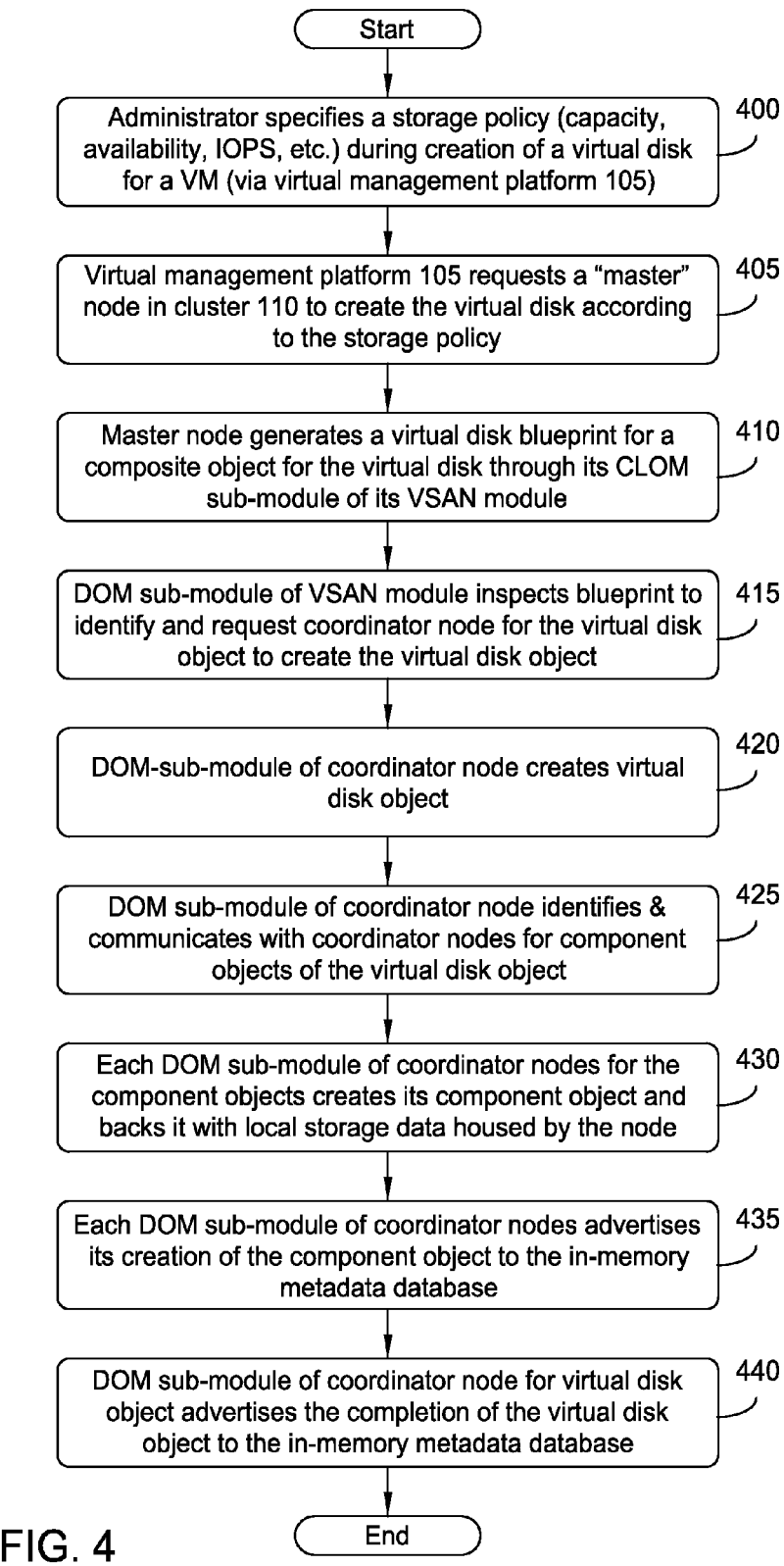
FIG. 4 illustrates a method flow diagram for creating a virtual disk object based on a defined storage policy, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMDS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
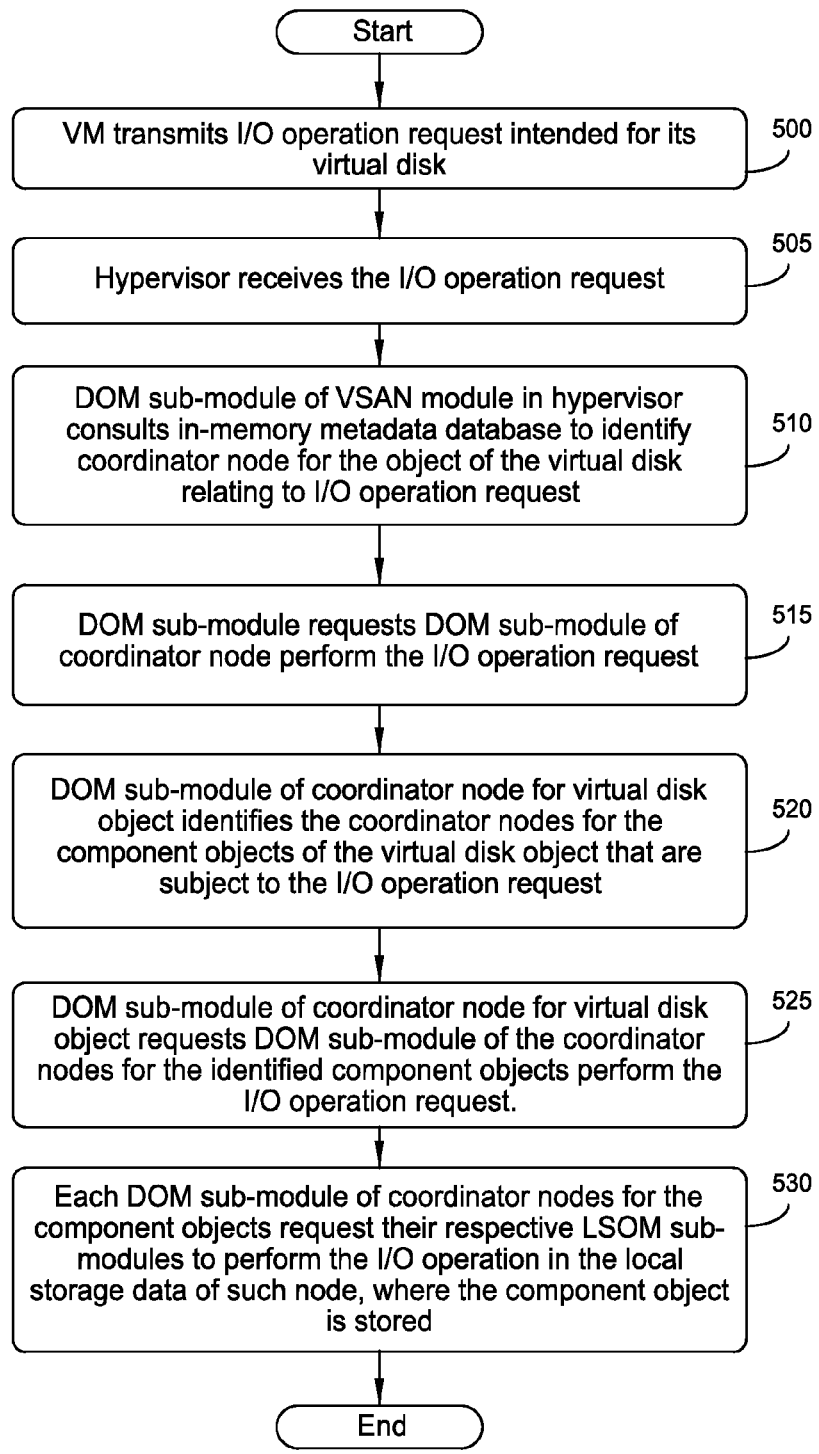
FIG. 5 illustrates the handling of an I/O operation originating from a VM, according to one embodiment.

FIG. 5 illustrates the handling of an I/O operation originating from a VM, according to one embodiment. When a VM running on a particular node performs I/O operations to its virtual disk, the VM's guest operating system, in step 500, transmits an I/O operation request intended for its virtual disk (through a device driver of the guest operating system) which, in step 505, is received by hypervisor 113 and ultimately transmitted and transformed through various layers of an I/O stack in hypervisor 113 to DOM sub-module 340 of VSAN module 114. In step 510, the I/O request received by DOM sub-module 340 includes a unique identifier for an object representing the virtual disk that DOM sub-module 340 uses to identify the coordinator node of the virtual disk object by accessing the in-memory metadata database of CMMDS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 515. As previously discussed, in certain embodiments, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 520, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 525, the DOM sub-module of the coordinator node for the virtual disk object requests that the DOM sub-modules for the coordinator nodes of the identified component objects perform the I/O operation request and, in step 530, the DOM sub-modules of such coordinator nodes for the identified component objects interact with their corresponding LSOM sub-modules to perform the I/O operation in the local storage resource where the component object is stored.

In certain situations, it should be recognized that multiple clients (e.g., other VSAN modules 114 acting on behalf of running VMs) may simultaneously send requests to perform I/O operations on a particular local storage resource located in a particular node at any given time. For example, the component objects (e.g., stripes, etc.) of different virtual disk objects corresponding to different VMs may be backed by the same local storage on the same node. Upon receiving an I/O operation, the VSAN module 114 of such a node may place the I/O operation into a storage resource queue for processing.

Figure 6:
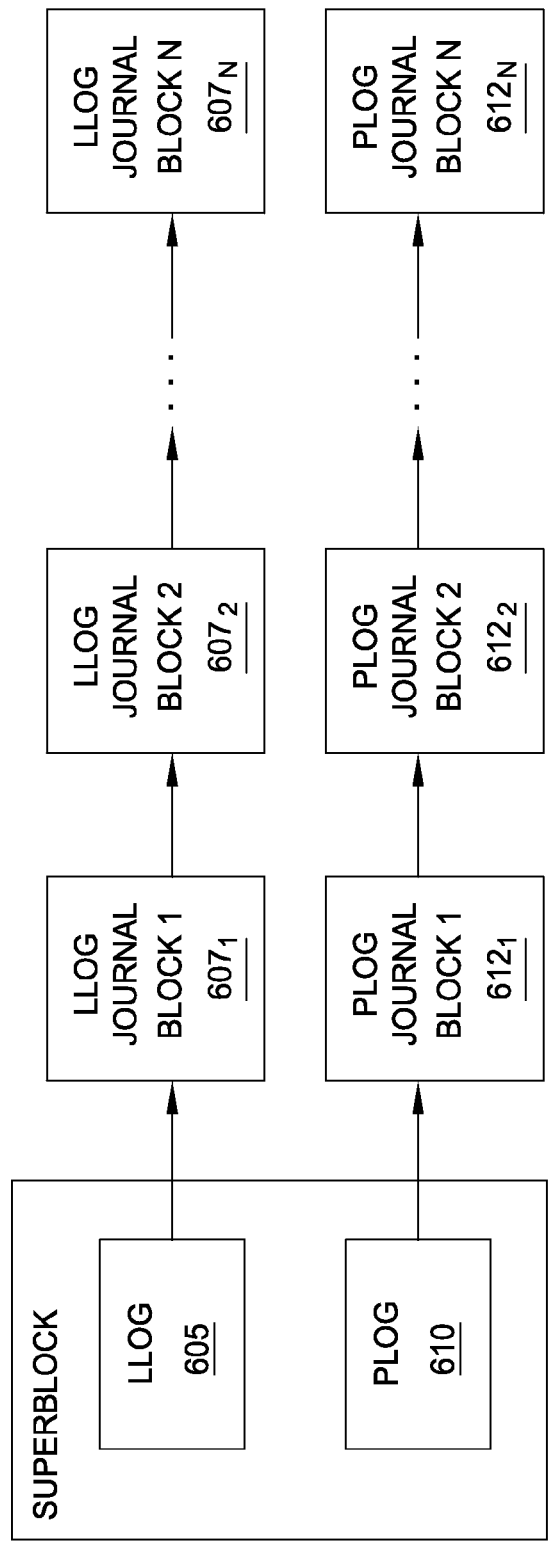
FIG. 6 illustrates a journal superblock in a solid state drive having a logical log and a physical log, according to one embodiment.

FIG. 6 illustrates a journal superblock on a SSD 117 in a VSAN disk group having a logical log (LLOG) 605 and a physical log (PLOG) 610, according to one embodiment. LLOG 605 participates in distributed transactions in the VSAN through commit protocols (e.g., one-and-a-half phase commit, two phase commit, etc.). PLOG 610 serves as the SSD write buffer for the attached magnetic disks, in effect constructing a hybrid drive having flash memory as a front-end to a magnetic disk.

As shown, LLOG 605 and PLOG 610 have pointers to separate journal block chains. Illustratively, LLOG 605 points to a sequence of LLOG journal blocks $607_{1-N}$, and PLOG 610 points to a sequence of PLOG journal blocks $612_{1-N}$. In general, each block 607 or 612 in the chain points to the next block 607 or 612, respectively. That is, when VSAN module 114 writes a block, VSAN module 144 also allocates a pointer to a new block. By allocating pointers to successive blocks, the VSAN module may pipeline read operations in the event of recovery. Each journal block 607 or 612 includes metadata records as well as delimiters indicating a block size. The metadata records indicate the object to which a given record applies, an offset, the length of data to be written, and an array of SSD block addresses where the data resides on the SSD.

Figure 7:
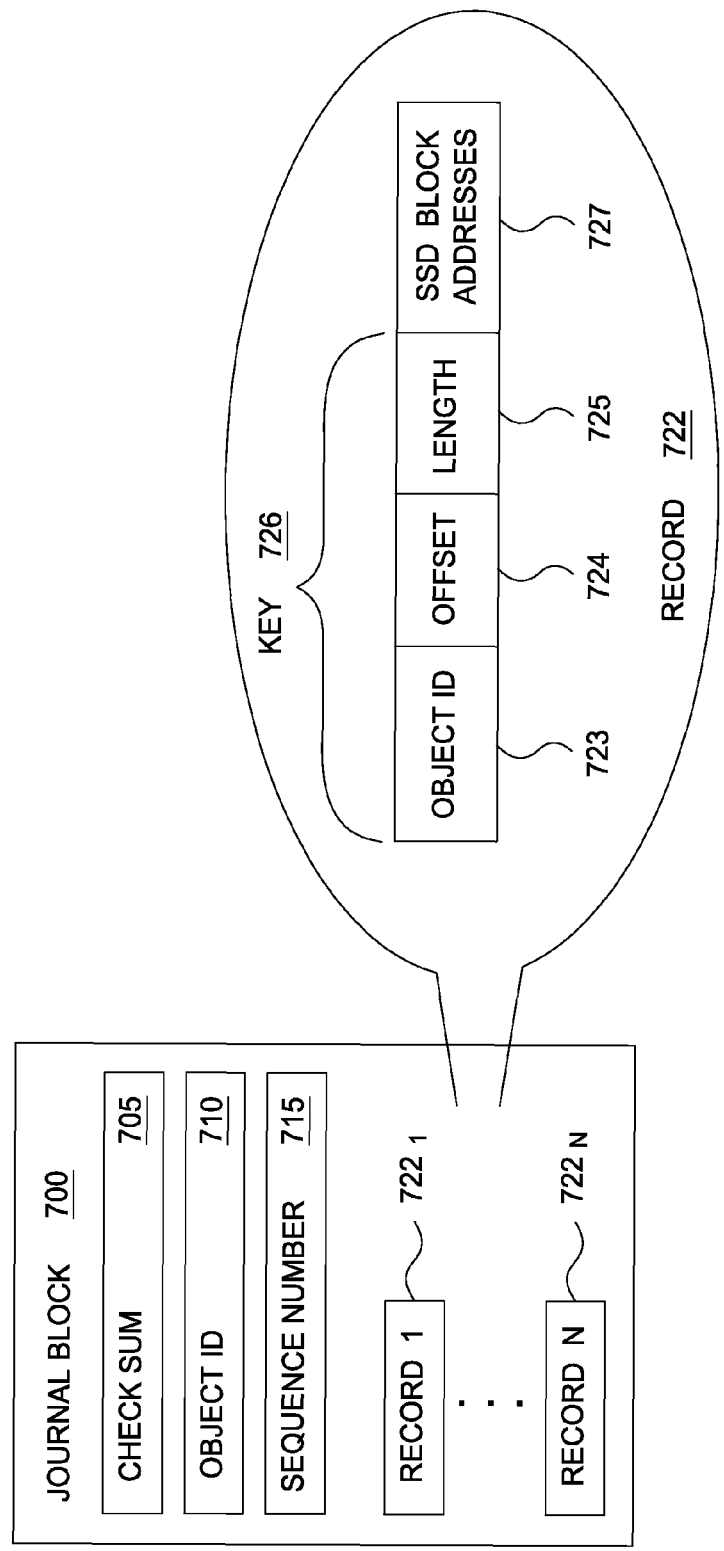
FIG. 7 illustrates an example journal block, according to one embodiment.

FIG. 7 illustrates an example journal block 700, according to one embodiment. Journal block 700 includes a header that includes a checksum 705, an object ID 710, and a sequence number 715. Checksum 705 protects the integrity of journal block 700 and indicates the end of the chain of block entries for LLOG 605 and PLOG 610. A journal block 700 with a checksum that does not hash into a valid value represents the last journal block 700 in the chain. In one embodiment, checksum 705 is an MD5 hash. Object ID 710 provides information about whether journal block 700 belongs to LLOG 605 or PLOG 610. In addition, object ID 710 may provide information about the corresponding component object belonging to journal block 700. Sequence number 715 is a monotonically incrementing number that allows VSAN module 114 to identify the order of journal block 700 in a sequence of block entries for a particular object. Generally, sequence number 715 is reasonably large (e.g., approximately a 64-bit value) to prevent a rollover in numbers regardless of the length of the sequence.

As stated, a journal block 700 may include metadata records $722_{1-N}$. Each record 722 is stored as a key-value pair, where key 726 includes an object ID 723, an offset 724, and a length 725. The object ID 723 portion of record 722 may provide a universally unique identifier corresponding to an associated composite object and a log sequence number. Additionally, object ID 724 may also provide an operation type. For example, if journal block 700 corresponds to a block of LLOG 605, operation types may include prepare and commit transactions for data and metadata write operations. If journal block 700 corresponds to a block of PLOG 610, operation types may include commit transactions for write operations. Offset 724 indicates where on the block to start writing data. Length 725 provides the overall length for the given block. Illustratively, the payload of the key-value pair of record 722 is a set of SSD block addresses 727 that indicate the block addresses on the SSD that record 722 references.

Further, when a journal block 700 is added into either LLOG 605 or PLOG 610, records 722 of journal block 700 are also added to a logical block addressing (LBA) table that corresponds to the journal and transaction type. A LBA table is a key-value store that maintains in-memory versions of record 722 and specifies the location of blocks of data. In one embodiment, separate LBA tables store in-memory records for LLOG prepared entries, LLOG committed entries, and PLOG committed entries. As the VSAN module inserts entries into each journal, the VSAN module also inserts the records to the respective LBA tables. The LBA table also identifies which committed entries to retire to magnetic disks, (i.e., from LLOG to PLOG, and from PLOG to disk).

Figure 8:
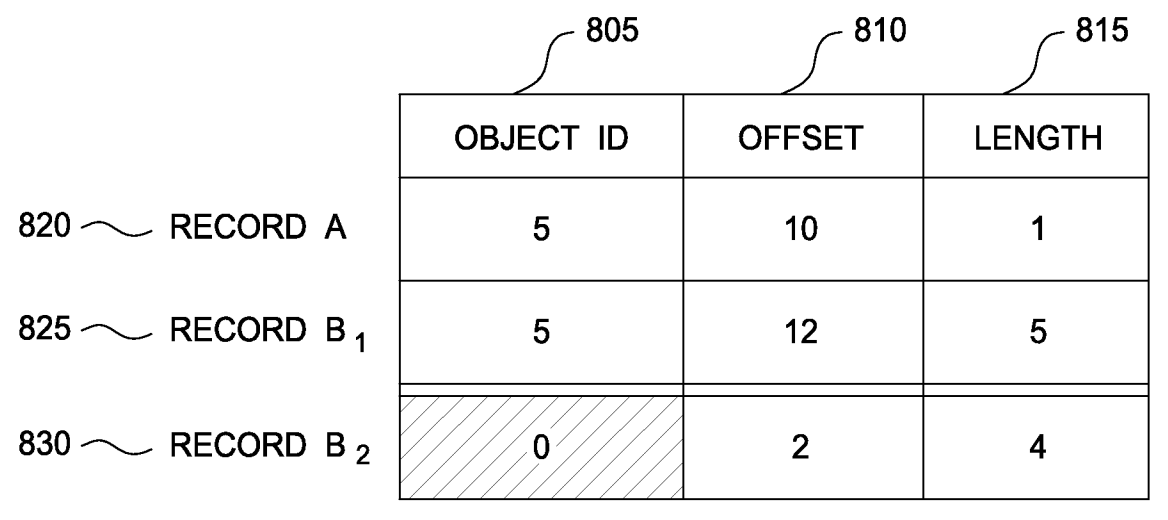

FIG. 8 illustrates an example use case for delta encoding a key-value record, according to one embodiment. The LBA table discussed above may include numerous entries. To address this issue, the key-value store provided in the LBA table (and any other dense data structures used in the VSAN environment) may be implemented as a compressed block map. In this example, assume that for a record 822, object ID 823 is a 128-bit value, offset 824 is a 64-bit value, and length 825 is a 64-bit value.

Illustratively, FIG. 8 depicts two records: a first entry record A 820 and second entry record $B_1$ 825. As shown, the object ID 805 field of record A 820 equals 5, and the object ID 805 field of record $B_1$ 825 equals 5. Further, the offset 810 field of record A 820 equals 10, and the offset 810 field of record $B_1$ 825 equals 12. Additionally, the length 815 field of record A equals 1, and the length 815 field equals 5. Generally, VSAN module 114 stores each key as the delta of the fields of the previous key. In this example, VSAN module 114 calculates the delta the fields of record A 820 with the fields of record $B_1$. As shown, the resulting record $B_2$ 830 has an object ID 805 field that equals 0, an offset 610 that equals 2, and a length field 815 that equals 4.

Further, the object ID 805 of record C 830 corresponds to zero. This indicates that object ID 805 fields for records A 820 and B 825 are identical, and therefore VSAN module 114 removes the leading zero bit. Doing so allows VSAN module 114 to store the object ID 805 information using a minimal number of bits (e.g., 1 bit).

Because consecutive keys in the LBA table (and other dense data structures of the VSAN) have similar properties and little differences from each other, it is plausible for each key entry be within range of fewer than 16 bits. For example, an LBA table may have a density of about 1%-3% of offsets present. As a result, the average distance in address may be about 100 units apart. Thus, if the units are randomly distributed, the average distance between entries is about 100 unit blocks, resulting in an average delta of 100 unit blocks, or approximately 7 bits.

VSAN module 114 addresses the compressed blocks via index blocks. Further, to achieve high space utilization, the contents of the compressed blocks are rebalanced and allocated across nearby blocks (in key space). Because the compressed blocks are in memory, rebalancing is less costly than if the blocks resided on disk. Additionally, to reduce access time for frequently referenced items, VSAN module 114 may maintain a cache of recently referenced items.

Figure 9:
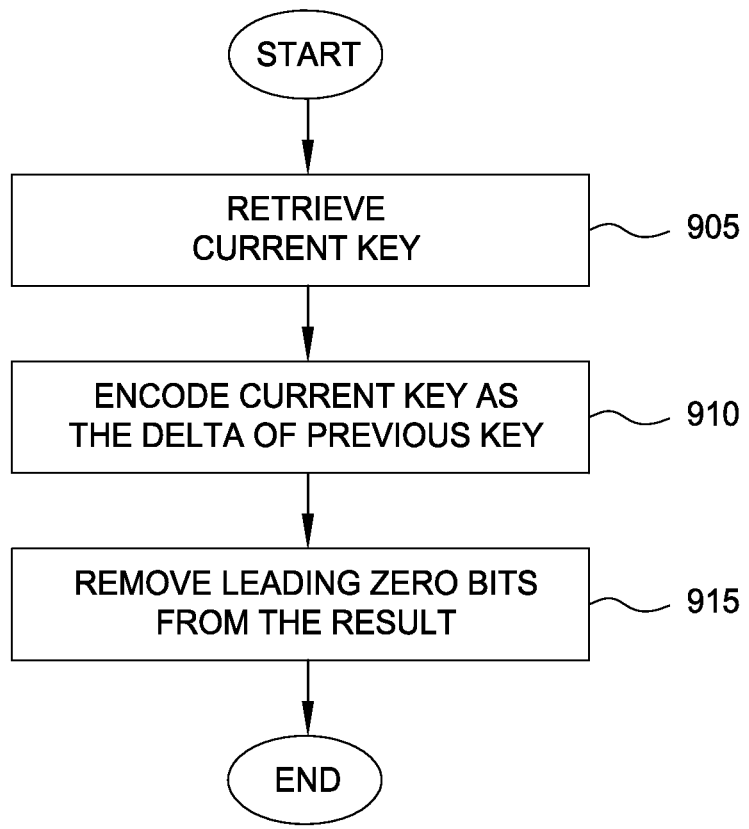
FIG. 9 illustrates a method for compressing key-value table entries using delta encoding, according to one embodiment.

FIG. 9 illustrates a method 900 for compressing key-value table entries using delta encoding, according to one embodiment. As noted, LSOM sub-module 350 stores each key as the delta for each of the fields of the previous one (with leading zero bits removed). For example, LSOM sub-module 350 stores delta encoded entries in the LBA table with the key-value record entries when the entries are inserted into the SSD journals.

As shown, method 900 begins at step 905, where the LSOM sub-module 350 retrieves a current key. Using the example from FIG. 8, LSOM sub-module 350 may retrieve the key of record $B_1$ 825. As stated, record $B_1$ 825 has three key fields: object ID 805 (a 128-bit value), offset 810 (a 64-bit value), and length 815 (a 64-bit value). The object ID 805 field equals 5, the offset 810 field equals 12, and the length field equals 5.

At step 910, LSOM sub-module 350 encodes the current key as the delta of the previous key (i.e., a bitwise subtraction of the two keys). In the given example, the previous key corresponds to the key of record A 820. As shown, the object ID 805 field equals 5, the offset 810 field equals 10, and the length 815 field equals 1. The delta result is record $B_2$, which is the difference of the key field values of record A from record $B_1$. The object ID 805 field equals 0, the offset 810 field equals 2, and the length 815 field equals 4.

At step 915, LSOM sub-module 350 removes the leading zero bits from each key field of the resulting record. In this example, because the object ID 805 field equals 0, LSOM sub-module 350 may store record $B_2$ with leading bits removed. Further, the zero value indicates that the record entry for object ID 805 is identical to the value for object ID 805 of the previous entry.

Thereafter, LSOM sub-module 350 creates a bit-level representation of the result using an encoding scheme. For example, one applicable scheme may encode the fields with a base-2 logarithm of the number of bits of each field. As another example, LSOM sub-module 350 may use a lookup table for bits (e.g., where a 0 entry maps to 0 bits, a 1 entry maps to 4 bits, etc.).

Similarly, LSOM sub-module 350 delta encodes from one payload field (e.g., block addresses of SSD 117 in an LBA table entry) to the next payload field and removes the leading zero bits from the result. Therefore, it is possible to compress a single entry to 27 bits on the order of approximately five or six bytes per entry. Using this approach, a 4K page of memory can potentially store as many as 700-800 entries, which is more entries that what LSOM sub-module 350 could store without the delta compression.

Further, LSOM sub-module 350 can compress the payload using delta encoding between consecutive allocations. To address gaps between allocations, LSOM sub-module 350 may group blocks of SSD 117 within the same general vicinity to be able to calculate consecutive allocations. For example, a 400 GB SSD that writes 4K blocks (i.e., 100 million blocks) is approximately 27 bits and does not require 64 bits to represent each block. If the data is allocated reasonably consecutively, the delta results may be even smaller than 27 bits.

As described, embodiments described herein provide techniques for maintaining a compressed block maps in a distributed resources system. The distributed resources system encodes keys of dense data structure entries as the delta from the key of the previous entry and removes the leading zero bits from the result. Advantageously, the delta encoding-based techniques allow a distributed resources system to store the key-value entries in a minimum number of bits while still providing reasonably efficient updates to the resources. Further, using the encoding techniques in dense in-memory tables allows the table to be maintained cost-effectively.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for storing key-value entries of a block map in a host computer system of a system of resources, the method comprising:
given a current entry having a current key having one or more fields and a current payload and a previous entry having a previous key and a previous payload, encoding each of the one or more fields in the current key as a first delta from a corresponding field in the previous key and encoding the current payload as a second delta from the previous payload;
removing leading zero bits in each resulting encoded field of the current key and leading zero bits in the encoded current payload; and
inserting the encoded one or more fields of the current key and the encoded current payload into a datastore residing in memory of the host computer system,
wherein the previous entry and the current entry are successive entries of the block map.

2. The method of claim 1, wherein the one or more fields corresponds to an object identifier, an offset, and a length, and wherein the current payload corresponds to block addresses of a solid state drive.

3. The method of claim 1, wherein the system of resources provides a software-defined virtual storage area network.

4. The method of claim 1, wherein the datastore maintains a cache of recently referenced entries.

5. The method of claim 1, wherein the current entry is addressed with an index block.

6. The method of claim 1, wherein the datastore is a logical block addressing table.

7. A non-transitory computer-readable storage medium storing instructions, which, when executed on a processor, performs an operation for storing key-value entries of a block map in a host computer system of a system of resources, the operation comprising:
given a current entry having a current key having one or more fields and a current payload and a previous entry having a previous key and a previous payload, encoding each of the one or more fields in the current key as a first delta from a corresponding field in the previous key and encoding the current payload as a second delta from the previous payload;
removing leading zero bits in each resulting encoded field of the current key and leading zero bits in the encoded current payload; and
inserting the encoded one or more fields of the current key and the encoded current payload into a datastore residing in memory of the host computer system,
wherein the previous entry and the current entry are successive entries of the block map.

8. The computer-readable storage medium of claim 7, wherein the one or more fields corresponds to an object identifier, an offset, and a length, and wherein the current payload corresponds to block addresses of a solid state drive.

9. The computer-readable storage medium of claim 7, wherein the system of resources provides a software-defined virtual storage area network.

10. The computer-readable storage medium of claim 7, wherein the datastore maintains a cache of recently referenced entries.

11. The computer-readable storage medium of claim 7, wherein the current entry is addressed with an index block.

12. The computer-readable storage medium of claim 7, wherein the datastore is a logical block addressing table.

13. A system, comprising:
a processor and
a memory hosting a module, which, when executed on the processor, performs an operation for storing key-value entries of a block map in a host computer system of a system of resources, the operation comprising:
given a current entry having a current key having one or more fields and a current payload and a previous entry having a previous key and a previous payload, encoding each of the one or more fields in the current key as a first delta from a corresponding field in the previous key and encoding the current payload as a second delta from the previous payload;
removing leading zero bits in each resulting encoded field of the current key and leading zero bits in the encoded current payload; and
inserting the encoded one or more fields of the current key and the encoded current payload into a datastore residing in memory of the host computer system,
wherein the previous entry and the current entry are successive entries of the block map.

14. The system of claim 13, wherein the one or more fields corresponds to an object identifier, an offset, and a length, and wherein the current payload corresponds to block addresses of a solid state drive.

15. The system of claim 13, wherein the system of resources provides a software-defined virtual storage area network.

16. The system of claim 13, wherein the datastore maintains a cache of recently referenced entries.

17. The system of claim 13, wherein the current entry is addressed with an index block.

* * * * *